(12) United States Patent
Shimokawa et al.

(10) Patent No.: US 9,511,783 B2
(45) Date of Patent: Dec. 6, 2016

(54) METHOD AND APPARATUS FOR DETECTING ABNORMALITY OF VEHICLE

(71) Applicants: NIPPON STEEL & SUMITOMO METAL CORPORATION, Tokyo (JP); THE UNIVERSITY OF TOKYO, Tokyo (JP)

(72) Inventors: Yoshiyuki Shimokawa, Tokyo (JP); Masaaki Mizuno, Tokyo (JP); Yoshihiro Suda, Tokyo (JP); Masahiko Aki, Tokyo (JP); Hiroyuki Sugiyama, Tokyo (JP); Koichi Ohtani, Tokyo (JP); Masuhisa Tanimoto, Osaka (JP); Yoshifumi Komura, Osaka (JP); Jun Kurihara, Tokyo (JP); Atsushi Iwamoto, Tokyo (JP); Takuya Saito, Tokyo (JP); Hiroshi Obayashi, Tokyo (JP)

(73) Assignees: NIPPON STEEL & SUMITOMO METAL CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 30 days.

(21) Appl. No.: 14/362,664

(22) PCT Filed: Dec. 6, 2012

(86) PCT No.: PCT/JP2012/081613
§ 371 (c)(1),
(2) Date: Jun. 4, 2014

(87) PCT Pub. No.: WO2013/084980
PCT Pub. Date: Jun. 13, 2013

(65) Prior Publication Data
US 2015/0019071 A1    Jan. 15, 2015

(30) Foreign Application Priority Data

Dec. 6, 2011   (JP) .................................. 2011-267322

(51) Int. Cl.
*B61K 9/12* (2006.01)
*B61K 13/00* (2006.01)
*G01M 17/08* (2006.01)

(52) U.S. Cl.
CPC ................ *B61K 9/12* (2013.01); *B61K 13/00* (2013.01); *G01M 17/08* (2013.01)

(58) Field of Classification Search
CPC ............... B60F 5/00; B60F 9/00; B61K 9/12; B61K 13/00; B61K 9/00; G01M 1/02; G01M 1/12; G01M 1/14; G01M 17/08–17/10; B61F 3/00–3/02; B61F 13/00; B61F 99/00
(Continued)

(56) References Cited

U.S. PATENT DOCUMENTS

| 3,718,040 | A | 2/1973 | Freeman et al. |
| 4,701,866 | A | 10/1987 | Harrison et al. |

(Continued)

FOREIGN PATENT DOCUMENTS

| EP | 1207091 | 5/2002 |
| JP | 53-098602 | 8/1978 |

(Continued)

OTHER PUBLICATIONS

Salient.pdf (Salient Systems, Salient Systems—Wheel Impact Load Detector (WILD), Jul. 27, 2008, http://www.salientsystems.com/prod_wild.html, p. 1; as archived http://web.archive.org/web/20080727012658/http://www.salientsystems.com/prod_wild.html).*

(Continued)

*Primary Examiner* — Bao Long T Nguyen
(74) *Attorney, Agent, or Firm* — Clark & Brody

(57) ABSTRACT

A vehicle abnormality detecting apparatus 1 includes wheel load sensors 11 that are attached to right and left rails R constituting a track to measure wheel loads of wheels 3 provided in a vehicle 2; and a calculation unit 12 that is connected to the wheel load sensors 11. An index represented by wheel loads of a pair or more of right and left wheels 3 provided in at least one of bogies 4 and defined according to a type of vehicle abnormality as an index for detecting the vehicle abnormality is previously stored in the calculation unit 12. The calculation unit 12 calculates a value of the stored index from the wheel loads measured by the wheel load sensors 11 and transmitted from the wheel load sensors 11, and detects the abnormality of a running vehicle based on the calculated value of the index.

21 Claims, 5 Drawing Sheets

(58) Field of Classification Search
USPC ............. 701/34.4, 19, 29.1, 31.4, 31.7–32.1, 33.5, 701/33.7–33.9; 238/1; 73/636; 324/217
See application file for complete search history.

(56) References Cited

U.S. PATENT DOCUMENTS

| | | | | |
|---|---|---|---|---|
| 5,492,002 | A * | 2/1996 | Higgins | G01M 17/10 73/1.14 |
| 6,043,774 | A * | 3/2000 | Singh | B61K 9/12 246/169 R |
| 6,862,503 | B2 * | 3/2005 | Dembosky | B61L 23/047 701/19 |
| 2002/0059075 | A1 * | 5/2002 | Schick | B61L 27/0094 701/31.4 |
| 2004/0056496 | A1 * | 3/2004 | Kenderian | G01M 17/10 295/8 |
| 2004/0167686 | A1 * | 8/2004 | Baker | B61L 23/00 701/19 |
| 2006/0196064 | A1 * | 9/2006 | Heimann | G01M 17/10 33/550 |
| 2006/0261218 | A1 * | 11/2006 | Mace | B61F 5/386 246/169 R |
| 2011/0238241 | A1 * | 9/2011 | Brady | B61L 25/025 701/19 |
| 2012/0203402 | A1 * | 8/2012 | Jape | B61L 27/0027 701/19 |

FOREIGN PATENT DOCUMENTS

| | | |
|---|---|---|
| JP | 54-063793 | 5/1979 |
| JP | 58-155303 | 9/1983 |
| JP | 5-231858 | 9/1993 |
| JP | 0003077724 | 3/2001 |
| JP | 2002-202182 | 7/2002 |
| JP | 2002-357492 | 12/2002 |
| JP | 2003-054403 | 2/2003 |
| JP | 2007-131125 | 5/2007 |
| JP | 2009-220815 | 10/2009 |
| JP | 2011-051518 | 3/2011 |

OTHER PUBLICATIONS

Salient.pdf (Salient Systems, Salient Systems—Wheel Impact Load Detector (WILD), Jul. 27, 2008, http://www.salientsystems.com/prod_wild.html, p. 1; as archived http://web.archive.org/web/20080727012658/http://www.salientsystems.com/prod_wild.html).*

Takuya Saito et al., "Chijo PQ . . . Kekka Hokoku", Dai 17 Kai Tetsudo Gijutsu Rengo Symposium, Dec. 2010, pp. 333-336.

* cited by examiner

METHOD AND APPARATUS FOR DETECTING ABNORMALITY OF VEHICLE

TECHNICAL FIELD

The present invention relates to a method and apparatus for detecting an abnormality of a vehicle. More particularly, the present invention relates to a method and apparatus for detecting an abnormality of a vehicle which can easily and inexpensively detect an abnormality of a running vehicle.

BACKGROUND ART

Conventionally, in order to improve running safety of a railway vehicle, online real-time monitoring for detecting an abnormality of a commercial vehicle (a railway vehicle in commercial operation) while the commercial vehicle is running has been performed with various sensors attached to the commercial vehicle by monitoring a state of the commercial vehicle running on a commercial line by the sensors (for example, see Patent Literatures 1 and 2).

However, to detect the abnormality of the running vehicle using the above method, the sensors need to be attached to all vehicles, and maintenance and inspection of the sensors are time-consuming. Therefore, the problems are that the vehicle abnormality cannot be easily detected, and it costs a lot.

CITATION LIST

Patent Literature

[Patent Literature 1] JP2009-220815A
[Patent Literature 2] JP2011-51518A

SUMMARY OF INVENTION

Technical Problem

An object of the present invention, which has been made to solve the problems of the conventional technique, is to provide a method and apparatus which can easily and inexpensively detect an abnormality of a running vehicle.

Solution to Problem

To achieve the above object, the present inventors studied on providing a sensor on a track along which a vehicle runs without attaching the sensor to the vehicle. The present inventors found that, when a wheel load sensor for measuring a wheel load of a wheel of the vehicle is provided on the track, a particular vehicle abnormality causes the wheel load measured by the wheel load sensor to be out of balance, and also found that the wheel load is out of balance differently depending on the type of vehicle abnormality.

The present invention has been completed based on the above findings by the present inventors.

The present invention provides a method for detecting an abnormality of a vehicle including a plurality of bogies each having a pair or more of right and left wheels while the vehicle is running on a track, the method comprising: an installation step of previously providing a wheel load sensor for measuring a wheel load of a wheel on the track; an index definition step of previously defining an index represented by wheel loads of the pair or more of right and left wheels provided in at least one of the bogies as an index for detecting a vehicle abnormality according to a type of the vehicle abnormality; a measurement step of measuring the wheel loads of the pair or more of right and left wheels provided in at least one of the bogies by the wheel load sensor provided on the track; and a detection step of calculating a value of the index defined in the index definition step from the wheel loads measured in the measurement step, and detecting the abnormality of the running vehicle based on the calculated value of the index.

In the present invention, providing the wheel load sensor on the track means attaching the wheel load sensor to right and left rails constituting the track.

In accordance with the present invention, since the vehicle abnormality is detected based on the wheel loads measured by the wheel load sensor provided on the track, the vehicle abnormality can be easily and inexpensively detected as compared to a case in which a sensor is attached to each vehicle. Also, since the index according to the type of the vehicle abnormality is defined, and the vehicle abnormality is detected based on the value of the index calculated from the measured wheel loads, the type of the vehicle abnormality can be determined.

In case that the vehicle includes a pair of front and back bogies each having two pairs of right and left wheels on front and back sides, preferably, in the index definition step, an index represented by wheel loads of the four wheels provided in at least one of the bogies is defined, and in the measurement step, the wheels loads of the four wheels provided in at least one of the bogies are measured.

In accordance with the preferred method, since the index represented by the wheel loads of the four wheels provided in at least one of the front and back bogies is used, it is expected that the index has higher accuracy, that is, the vehicle abnormality can be accurately detected.

In case that the vehicle includes a pair of front and back bogies each having two pairs of right and left wheels on front and back sides, preferably, in the index definition step, a primary spring abnormality index as an index when the type of the vehicle abnormality is a primary spring abnormality is defined as in Expression (1) below, and in the detection step, a value of the primary spring abnormality index is calculated from the wheel loads measured in the measurement step, and it is determined that the primary spring abnormality occurs in the running vehicle when the calculated value of the primary spring abnormality index is larger than a predefined reference value, $$\text{Primary spring abnormality index} = |(P1+P4)-(P2+P3)| \quad (1)$$

where P1 to P4 are the wheel loads of the wheels provided in at least one of the bogies: P1 represents a wheel load of a wheel located on a front right side of the bogie; P2 a wheel load of a wheel located on a front left side of the bogie; P3 a wheel load of a wheel located on a back right side of the bogie; and P4 a wheel load of a wheel located on a back left side of the bogie in Expression (1).

In the present invention, the primary spring abnormality means an abnormality of a primary spring provided in the bogie, e.g., breakage of a coil spring provided in the bogie.

The primary spring is provided in each of the wheels. When the primary spring of any of the wheels becomes abnormal, a weight of the bogie applied to the wheel where the primary spring is provided is applied to the wheel longitudinally or laterally adjacent to the wheel. For example, when the primary spring of the wheel located on the front right side of the bogie becomes abnormal, the weight of the bogie applied to the wheel located on the front right side is applied to the wheel located on the front left side or the wheel located on the back right side. As described above, when the primary spring abnormality occurs, the wheel longitudinally or laterally adjacent to the wheel where the primary spring abnormality occurs is affected in association with a positional relationship in one bogie.

Therefore, the primary spring abnormality can be detected by evaluating an absolute value of a difference between a total of the respective wheel loads of the wheels located on the front right side and the back left side of the bogie (P1+P4), and a total of the respective wheel loads of the wheels located on the front left side and the back right side of the bogie (P2+P3). Accordingly, the primary spring abnormality index can be defined as in Expression (1).

In accordance with the above preferred method, the primary spring abnormality can be easily and inexpensively detected.

Determining that the primary spring abnormality occurs in the running vehicle when the value of the primary spring abnormality index calculated from the measured wheel loads is larger than the predefined reference value is a concept including determining that the primary spring abnormality occurs when a value of another index (e.g., an index obtained by standardizing the primary spring abnormality index into a dimensionless quantity) in correlation with the primary spring abnormality index is larger than a reference value previously defined for the another index.

Also, in case that the vehicle includes a pair of front and back bogies each having two pairs of right and left wheels on front and back sides, preferably, in the index definition step, a secondary spring abnormality index as an index when the type of the vehicle abnormality is a secondary spring abnormality is defined as in Expression (2) below, and in the detection step, a value of the secondary spring abnormality index is calculated from the wheel loads measured in the measurement step, and it is determined that the secondary spring abnormality occurs in the running vehicle when the calculated value of the secondary spring abnormality index is larger than a predefined reference value, $$\text{Secondary spring abnormality index} = |(P1+P3+P6+P8)-(P2+P4+P5+P7)| \quad (2)$$

where P1 represents a wheel load of a wheel located on a front right side of the front bogie; P2 a wheel load of a wheel located on a front left side of the front bogie; P3 a wheel load of a wheel located on a back right side of the front bogie; P4 a wheel load of a wheel located on a back left side of the front bogie; P5 a wheel load of a wheel located on a front right side of the back bogie; P6 a wheel load of a wheel located on a front left side of the back bogie; P7 a wheel load of a wheel located on a back right side of the back bogie; and P8 a wheel load of a wheel located on a back left side of the back bogie in Expression (2).

In the present invention, the secondary spring abnormality means an abnormality of a secondary spring provided in the bogie, e.g., an abnormality of an air spring provided in the bogie.

The secondary spring is provided on a left side and a right side of each of the front and back bogies, in other words, on front right, front left, back right, and back left sides of the vehicle. When the secondary spring of any of the bogies becomes abnormal and cannot support a weight of the vehicle, the weight of the vehicle applied to the wheels on the side of the bogie where the secondary spring is provided is applied to the wheels in the vicinity of the secondary spring longitudinally or laterally adjacent to the secondary spring.

For example, when the secondary spring on the right side of the front bogie becomes abnormal, the weight of the vehicle applied to the wheels (front and back wheels) located on the right side of the front bogie is applied to the wheels (front and back wheels) located on the left side of the front bogie or the wheels (front and back wheels) located on the right side of the back bogie. As described above, when the secondary spring abnormality occurs, the wheels in the vicinity of the secondary spring longitudinally or laterally adjacent to the secondary spring where the abnormality occurs are affected in association with a positional relationship in the vehicle.

Therefore, the secondary spring abnormality can be detected by evaluating an absolute value of a difference between a total of the respective wheel loads of the wheels located on the right side of the front bogie and the left side of the back bogie (P1+P3+P6+P8), and a total of the respective wheel loads of the wheels located on the left side of the front bogie and the right side of the back bogie (P2+P4+P5+P7). Accordingly, the secondary spring abnormality index can be defined as in Expression (2).

In accordance with the above preferred method, the secondary spring abnormality can be easily and inexpensively detected.

Determining that the secondary spring abnormality occurs in the running vehicle when the value of the secondary spring abnormality index calculated from the measured wheel loads is larger than the predefined reference value is a concept including determining that the secondary spring abnormality occurs when a value of another index (e.g., an index obtained by standardizing the secondary spring abnormality index into a dimensionless quantity) in correlation with the secondary spring abnormality index is larger than a reference value previously defined for the another index.

Further, in case that the vehicle includes a pair of front and back bogies each having two pairs of right and left wheels on front and back sides, preferably, in the index definition step, a first static wheel load imbalance abnormality index, a second static wheel load imbalance abnormality index, a third static wheel load imbalance abnormality index, and a fourth static wheel load imbalance abnormality index as an index when the type of the vehicle abnormality is a static wheel load imbalance abnormality are respectively defined as in Expressions (3), (4), (5), and (6) below, and in the detection step, values of the first to fourth static wheel load imbalance abnormality indexes are calculated from the wheel loads measured in the measurement step, and it is determined that the static wheel load imbalance abnormality occurs in the running vehicle when any of the calculated values of the first to fourth static wheel load imbalance abnormality indexes is larger than a predefined corresponding reference value, $$\text{First static wheel load imbalance abnormality index} = |(P1+P3+P5+P7)-(P2+P4+P6+P8)| \quad (3)$$

$$\text{Second static wheel load imbalance abnormality index} = |(P1+P4)-(P2+P3)| \quad (4)$$

$$\text{Third static wheel load imbalance abnormality index} = |(P5+P8)-(P6+P7)| \quad (5)$$

$$\text{Fourth static wheel load imbalance abnormality index} = |(P1+P3)+(P6+P8)-(P2+P4)-(P5+P7)| \quad (6)$$

where P1 represents a wheel load of a wheel located on a front right side of the front bogie; P2 a wheel load of a wheel located on a front left side of the front bogie; P3 a wheel load of a wheel located on a back right side of the front bogie; P4 a wheel load of a wheel located on a back left side of the front bogie; P5 a wheel load of a wheel located on a front right side of the back bogie; P6 a wheel load of a wheel located on a front left side of the back bogie; P7 a wheel load of a wheel located on a back right side of the back bogie; and P8 a wheel load of a wheel located on a back left side of the back bogie in Expressions (3) to (6).

In the present invention, the static wheel load imbalance abnormality is an abnormality in which the weight of the vehicle applied to the eight wheels provided in the vehicle is out of balance.

Examples of the type of the static wheel load imbalance abnormality include lateral eccentricity of the vehicle, twist of the bogie, and twist of the vehicle.

The lateral eccentricity of the vehicle means that a total of the wheel loads of the wheels located on a right side of the vehicle and a total of the wheel loads of the wheels located on a left side of the vehicle are out of balance. Thus, the index of the static wheel load imbalance abnormality (the first static wheel load imbalance abnormality index) corresponding to the lateral eccentricity of the vehicle can be expressed by Expression (3).

The twist of the bogie means that a total of the wheel loads of the wheels located in one of two diagonal directions of one bogie, and a total of the wheel loads of the wheels located in the other of the diagonal directions are out of balance. Thus, the index of the static wheel load imbalance abnormality (the second and third static wheel load imbalance abnormality indexes) corresponding to the twist of the bogie can be expressed by Expressions (4) and (5).

The twist of the vehicle means that a total of the wheel loads of the wheels located in one of two diagonal directions of the vehicle, and a total of the wheel loads of the wheels located in the other of the diagonal directions are out of balance. Thus, the index of the static wheel load imbalance abnormality (the fourth static wheel load imbalance abnormality index) corresponding to the twist of the vehicle can be expressed by Expression (6).

In accordance with the above preferred method, the static wheel load imbalance abnormality can be easily and inexpensively detected.

Determining that the static wheel load imbalance abnormality occurs in the running vehicle when any of the values of the static wheel load imbalance abnormality indexes calculated from the measured wheel loads is larger than the predefined reference value is a concept including determining that the static wheel load imbalance abnormality occurs when another index (e.g., an index obtained by standardizing each static wheel load imbalance abnormality index into a dimensionless quantity) in correlation with each static wheel load imbalance abnormality index is larger than a reference value previously defined for the another index.

Only a pair of wheel load sensors needs to be attached to the right and left rails constituting the track in order to measure the wheel loads of the wheels provided in the vehicle. The wheel load sensors sequentially measure the wheel loads of the wheels passing through positions where the wheel load sensors are provided, so that the wheel loads of all the wheels provided in the vehicle can be measured. Therefore, the index value according to the type of the vehicle abnormality can be calculated based on the measured wheel loads. At this point, even when the positions of the respective wheel load sensors attached to the right and left rails are longitudinally displaced from each other with respect to a running direction of the vehicle, the index value can be calculated from the wheel loads measured by the respective wheel load sensors. However, when the positions of the respective wheel load sensors attached to the right and left rails are longitudinally displaced from each other with respect to the running direction of the vehicle, a lateral balance of the wheel loads cannot be accurately measured since the wheel loads measured by the respective wheel load sensors are not measured at the same time. The accuracy of the calculated index value may be thereby deteriorated.

Therefore, preferably, in the installation step, the wheel load sensor is provided on the track so as to be able to measure the wheel loads of any of the pairs of wheels on the front and back sides provided in any of the bogies at the same time. To be more specific, for example, the pair of wheel load sensors may be attached on a straight line perpendicular to the right and left rails.

In accordance with the preferred method, since the wheel load sensors are attached to the right and left rails of the track so as to be able to measure the wheel loads of the pair of right and left wheels provided in one bogie at the same time, the lateral balance of the wheel loads can be accurately measured, and the accuracy of the calculated index value can be improved. Also, since only the pair of wheel load sensors are required, a cost decrease is achieved.

Alternatively, preferably, in the installation step, the wheel load sensor is provided on the track so as to be able to measure the wheel loads of the four wheels provided in any of the bogies at the same time. To be more specific, four wheel load sensors may be attached as the wheel load sensor to positions of the right and left rails corresponding to arrangement positions of the four wheels provided in the bogie.

In accordance with the preferred method, since the wheel loads of the four wheels provided in one bogie can be measured at the same time, the value of the index represented by the wheel loads of the four wheels provided in the bogie, e.g., the primary spring abnormality index value can be accurately calculated.

Alternatively, preferably, in the installation step, the wheel load sensor is provided on the track so as to be able to measure the wheel loads of the eight wheels provided in the vehicle at the same time. To be more specific, eight wheel load sensors may be attached as the wheel load sensor to positions of the right and left rails corresponding to arrangement positions of the eight wheels provided in the vehicle.

In accordance with the preferred method, since the wheel loads of the eight wheels provided in the vehicle can be measured at the same time, the value of the index represented by the wheel loads of the eight wheels provided in the vehicle, e.g., the secondary spring abnormality index value or the static wheel load imbalance abnormality index value can be accurately calculated.

As the wheel load sensor, a sensor including a strain gauge, or a load cell can be used.

To achieve the above object, the present invention further provides An apparatus for detecting an abnormality of a vehicle including a plurality of bogies each having a pair or more of right and left wheels while the vehicle is running on a track, the apparatus comprising: a wheel load sensor that is provided on the track to measure a wheel load of a wheel of the vehicle; and a calculation unit that is connected to the wheel load sensor, wherein an index represented by wheel loads of the pair or more of right and left wheels provided in at least one of the bogies and defined according to a type of vehicle abnormality as an index for detecting the vehicle abnormality is previously stored in the calculation unit, and the calculation unit calculates a value of the stored index from the wheel loads measured by the wheel load sensor and transmitted from the wheel load sensor, and detects the abnormality of the running vehicle based on the calculated value of the index.

Advantageous Effect of Invention

In accordance with the present invention, the abnormality of the running vehicle can be easily and inexpensively detected.

BRIEF DESCRIPTION OF DRAWINGS

FIGS. 2A to 2C are views for explaining a specific configuration of a wheel load sensor of the vehicle abnormality detecting apparatus shown in FIG. 1 provided on a rail.

DESCRIPTION OF EMBODIMENTS

In the following, a method for detecting an abnormality of a vehicle according to one embodiment of the present invention is described by appropriately referring to the accompanying drawings.

Figure 1:
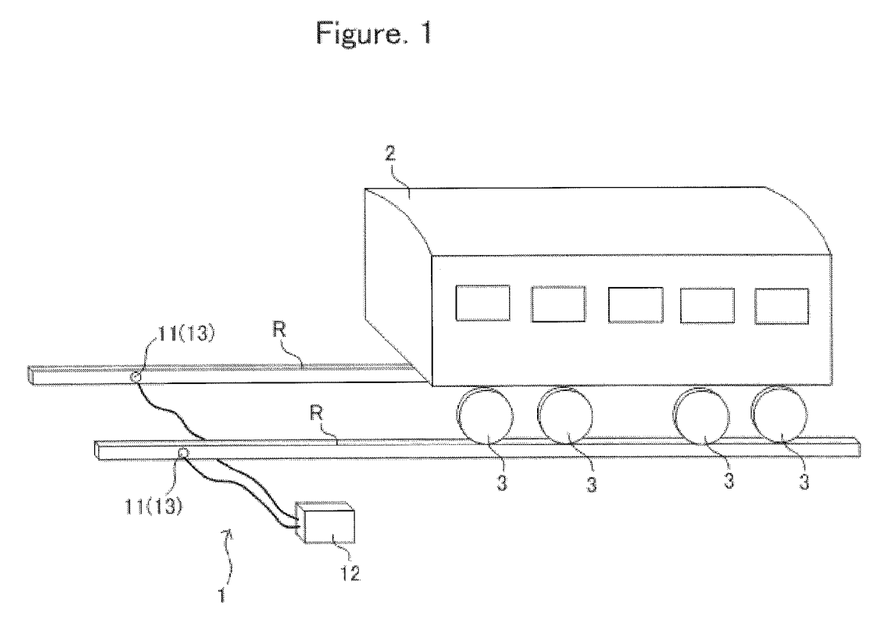
FIG. 1 is a configuration view schematically illustrating one example of a vehicle abnormality detecting apparatus used for a method for detecting an abnormality of a vehicle according to one embodiment of the present invention.

FIG. 1 is a configuration view schematically illustrating one example of a vehicle abnormality detecting apparatus used for the method for detecting an abnormality of a vehicle according to the present embodiment.

A vehicle abnormality detecting apparatus 1 of the present embodiment includes wheel load sensors 11 that are attached to right and left rails R constituting a track to measure wheel loads of wheels 3 provided in a vehicle 2, and a calculation unit 12 that is connected to the wheel load sensors 11. The calculation unit 12 calculates a value of an index for detecting a vehicle abnormality described below based on the wheel loads measured by the wheel load sensors 11 and transmitted from the wheel load sensors 11.

The wheel load sensor 11 includes, for example, a strain gauge 13. In the present embodiment, a case in which a sensor including the strain gauge 13 is used as the wheel load sensor 11 is described as an example. A calculation formula for the index for detecting a vehicle abnormality is stored in the calculation unit 12, and a program for calculating the index value from the wheel loads measured by the wheel load sensors 11 based on the calculation formula is installed in the calculation unit 12.

Figure 2A:
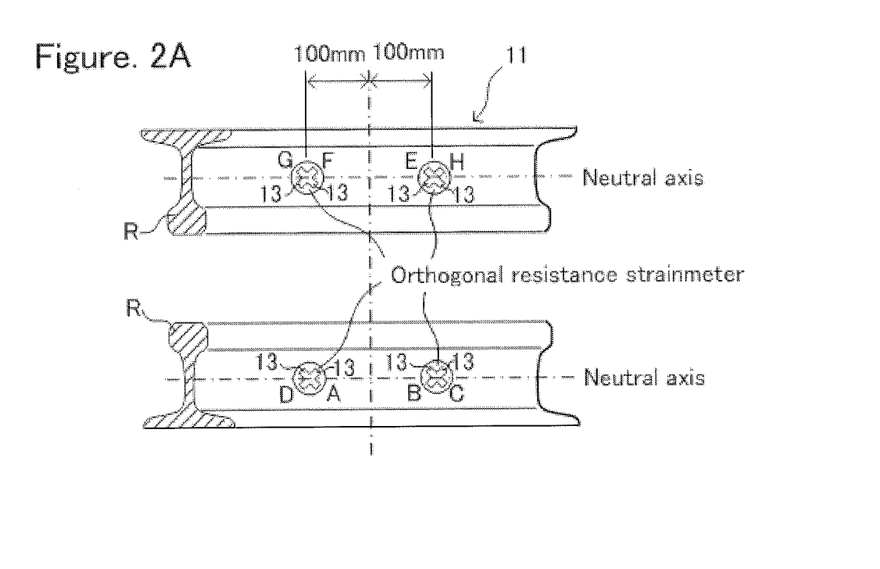
FIG. 2A is a view illustrating a state in which strain gauges constituting the wheel load sensor are attached to (stuck to) the rail.
Figure 2B:
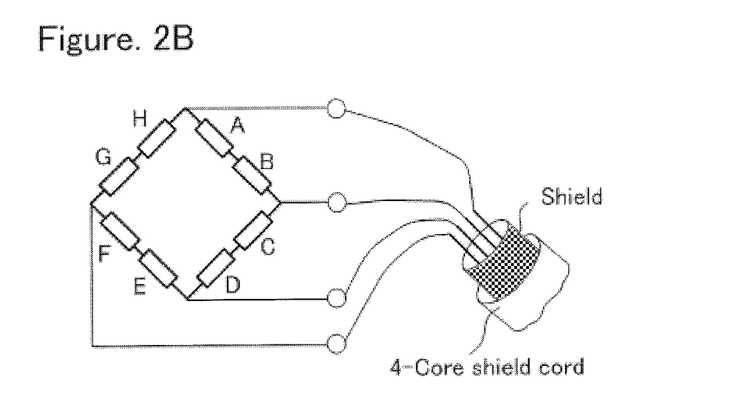
FIG. 2B is a connection wiring diagram of the strain gauges.
Figure 2C:
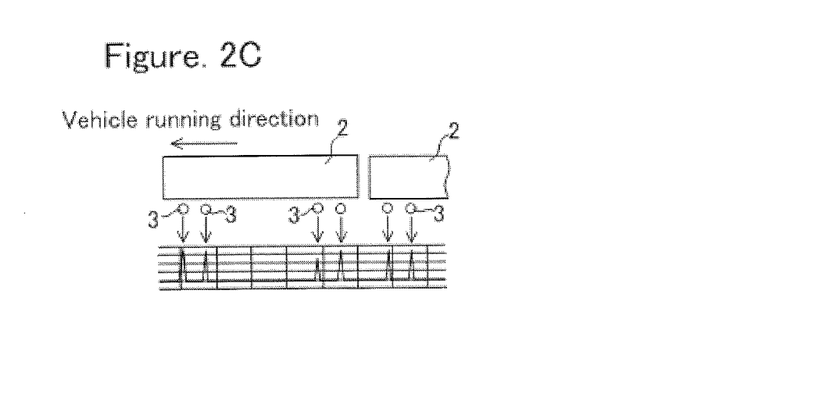
FIG. 2C is a view illustrating waveforms of the wheel loads measured by the strain gauges.

FIGS. 2A to 2C are views for explaining a specific configuration of the wheel load sensor of the vehicle abnormality detecting apparatus shown in FIG. 1 provided on the rail. FIG. 2A is a view illustrating a state in which the strain gauges constituting the wheel load sensor are attached to (stuck to) the rail. FIG. 2B is a connection wiring diagram of the strain gauges. FIG. 2C is a view illustrating waveforms of the wheel loads measured by the strain gauges. In FIG. 2A, side views of both side surfaces of the rail to which the strain gauges are stuck are shown in a developed fashion to upper and lower sides of the drawing.

In the present embodiment, four orthogonal resistance strainmeters each composed of a pair of strain gauges 13 orthogonal to each other (a total of eight strain gauges) are stuck, two by two, to the both side surfaces (middle portions) of the rail R. Each of the strain gauges 13 is inclined 45° with respect to a neutral axis. One wheel load sensor 11 includes the four orthogonal resistance strainmeters stuck to the rail R as described above. To be more specific about the wheel load sensor 11, the wheel load sensor 11 is composed of the eight strain gauges 13, a wire connecting the respective strain gauges 13, and a shield or the like covering the wire.

When strain waveforms of the passing wheels are recorded by connecting the four orthogonal resistance strainmeters as shown in FIG. 2B, projecting waveforms as shown in FIG. 2C are recorded with strain waveforms of a measurement section of the rail R cancelled or synthesized. The height of the projecting waveform is proportional to the wheel load.

The pair of wheel load sensors 11 are attached to the right and left rails R constituting the track. The wheel load sensors 11 sequentially measure the wheel loads of the passing wheels 3, so that the wheel loads of all the wheels 3 provided in the vehicle 2 can be measured. Therefore, the calculation unit 12 can calculate the index value according to the type of vehicle abnormality described below based on the wheel loads measured by the wheel load sensors 11. Since only the pair of wheel load sensors 11 are required as described above, the vehicle abnormality detecting apparatus 1 can be provided at low cost.

Figure 3:
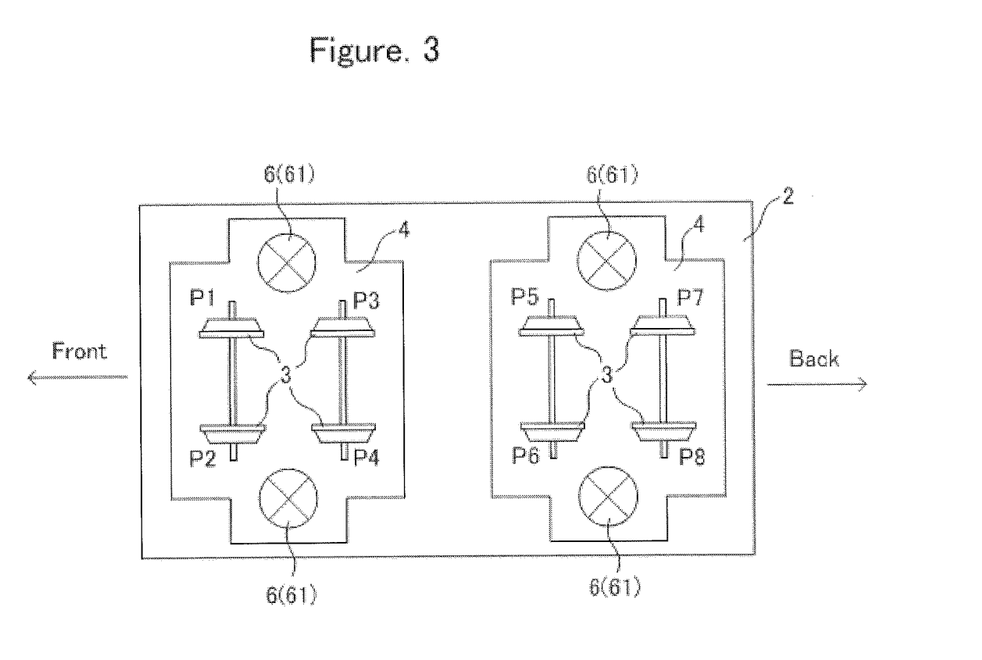
FIG. 3 is a schematic configuration view illustrating one example of a vehicle.
Figure 4:
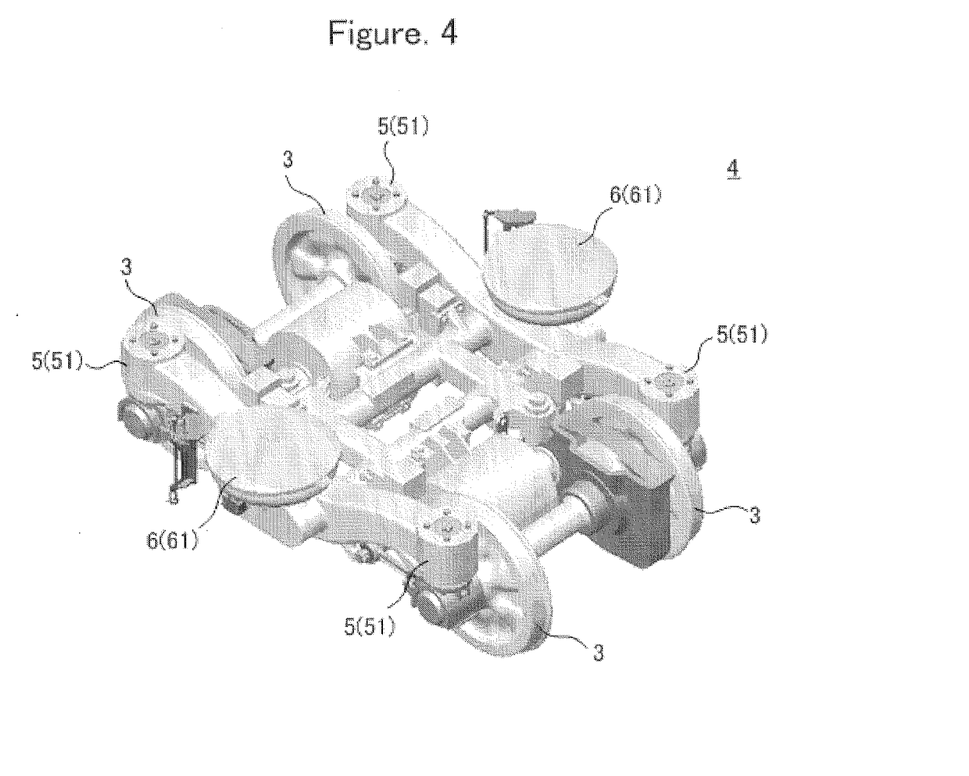
FIG. 4 is a schematic configuration view of a bogie constituting the vehicle shown in FIG. 3.

FIG. 3 is a schematic configuration view illustrating one example of the vehicle. FIG. 4 is a schematic configuration view of a bogie constituting the vehicle shown in FIG. 3.

The vehicle 2 includes a pair of front and back bogies 4 each having the wheels 3 on front right, front left, back right, and back left sides.

Each of the wheels 3 is supported by a primary spring 5. For example, a coil spring 51 may be used as the primary spring 5. In the present embodiment, a case in which the coil spring 51 is used as the primary spring 5 is described as an example. Each of the bogies 4 includes secondary springs 6 on right and left sides. For example, an air spring 61 may be used as the secondary spring 6. In the present embodiment, a case in which the air spring 61 is used as the secondary spring 6 is described as an example.

In the following description, reference character P1 denotes a wheel load of a wheel 3 located on the front right side of the front bogie 4, P2 a wheel load of a wheel 3 located on the front left side of the front bogie 4, P3 a wheel load of a wheel 3 located on the back right side of the front bogie 4, P4 a wheel load of a wheel 3 located on the back left side of the front bogie 4, P5 a wheel load of a wheel 3 located on the front right side of the back bogie 4, P6 a wheel load of a wheel 3 located on the front left side of the back bogie 4, P7 a wheel load of a wheel 3 located on the back right side of the back bogie 4, and P8 a wheel load of a wheel 3 located on the back left side of the back bogie 4.

To detect the abnormality of the running vehicle 2, the wheel load sensors 11 for measuring the wheel loads of the wheels 3 are previously provided on the track as described above (an installation step). An index represented by the wheel loads of the four wheels 3 provided in at least one of the bogies 4 as the index for detecting the vehicle abnormality is previously defined according to the type of the vehicle abnormality (an index definition step). The predefined index (the calculation formula for the index) is stored in the calculation unit 12 as described above.

In the following, a method for detecting an abnormality in a case in which the type of the vehicle abnormality is a primary spring abnormality is described.

When the coil spring 51 as the primary spring 5 of any of the wheels 3 is, for example, broken and cannot support the wheel load, a weight of the bogie 4 applied to the wheel 3 where the coil spring 51 is provided is applied to the wheel 3 longitudinally or laterally adjacent to the wheel 3.

For example, when the coil spring 51 of the wheel 3 located on the front right side of the bogie 4 is broken, the weight of the bogie 4 applied to the wheel 3 located on the front right side is applied to the wheel 3 located on the front left side or the wheel 3 located on the back right side. As described above, when the primary spring abnormality occurs, the wheel 3 longitudinally or laterally adjacent to the wheel 3 where the primary spring abnormality occurs is affected in association with a positional relationship in one bogie 4.

Therefore, the primary spring abnormality can be detected by evaluating an absolute value of a difference between a total of the respective wheel loads of the wheels 3 located on the front right side and the back left side of the front bogie 4 (P1+P4), and a total of the respective wheel loads of the wheels 3 located on the front left side and the back right side of the front bogie 4 (P2+P3), or an absolute value of a difference between a total of the respective wheel loads of the wheels 3 located on the front right side and the back left side of the back bogie 4 (P5+P8), and a total of the respective wheel loads of the wheels 3 located on the front left side and the back right side of the back bogie 4 (P6+P7). Accordingly, a primary spring abnormality index can be defined as in Expressions (11) and (12).

$$\text{Primary spring abnormality index} = |(P1+P4)-(P2+P3)| \quad (11)$$

$$\text{Primary spring abnormality index} = |(P5+P8)-(P6+P7)| \quad (12)$$

The calculation formulas for the primary spring abnormality index are previously stored in the calculation unit 12. Since the index can be represented by the wheel loads of the four wheels as described above, it is expected that the index has higher accuracy, and the abnormality of the vehicle 2 can be accurately detected.

The wheel loads P1 to P4 and/or P5 to P8 of the four wheels 3 provided in at least one of the front and back bogies 4 are measured by the wheel load sensors 11 provided on the track (a measurement step).

The wheel loads P1 to P4 and/or P5 to P8 measured by the wheel load sensors 11 are transmitted to the calculation unit 12 from the wheel load sensors 11. The calculation unit 12 calculates a value of the primary spring abnormality index by the previously installed program based on Expression (11) and/or Expression (12) described above. An operator determines that the primary spring abnormality occurs when the calculated value of the primary spring abnormality index is larger than a predefined reference value (a detection step). Alternatively, a configuration in which the reference value is previously stored in the calculation unit 12, and the calculation unit 12 automatically determines that the primary spring abnormality occurs when the calculated value of the primary spring abnormality index is larger than the stored reference value may be also employed. The reference value for determination may be defined according to a curvature of the track at a position where the wheel load sensor 11 is provided or a weight of the vehicle.

As described above, whether the primary spring abnormality occurs can be determined based on the primary spring abnormality index value calculated from the wheel loads measured by the wheel load sensors 11 provided on the rails. Accordingly, the primary spring abnormality can be easily and inexpensively detected as compared to a case in which a sensor is attached to the vehicle.

Next, a method for detecting an abnormality in a case in which the type of the vehicle abnormality is a secondary spring abnormality is described.

The air spring 61 as the secondary spring 6 is provided on a left side and a right side of each of the front and back bogies 4, in other words, on front right, front left, back right, and back left sides of the vehicle 2. When the air spring 61 of any of the bogies 4 becomes abnormal and cannot support a weight of the vehicle, the weight of the vehicle applied to the wheels 3 on the side of the bogie 4 where the air spring 61 is provided is applied to the wheels 3 in the vicinity of the air spring 61 longitudinally or laterally adjacent to the air spring 61.

For example, when the air spring 61 on the right side of the front bogie 4 becomes abnormal, the weight of the vehicle applied to the wheels (front and back wheels) 3 located on the right side of the front bogie 4 is applied to the wheels (front and back wheels) 3 located on the left side of the front bogie 4 or the wheels (front and back wheels) 3 located on the right side of the back bogie 4. As described above, when the abnormality of the air spring 61 occurs, the wheels 3 in the vicinity of the air spring 61 longitudinally or laterally adjacent to the air spring 61 where the abnormality occurs are affected in association with a positional relationship in the vehicle 2.

Therefore, the secondary spring abnormality can be detected by evaluating an absolute value of a difference between a total of the respective wheel loads of the wheels 3 located on the right side of the front bogie 4 and the left side of the back bogie 4 (P1+P3+P6+P8), and a total of the respective wheel loads of the wheels 3 located on the left side of the front bogie 4 and the right side of the back bogie 4 (P2+P4+P5+P7). Accordingly, a secondary spring abnormality index can be defined as in Expression (13).

$$\text{Secondary spring abnormality index} = |(P1+P3+P6+P8)-(P2+P4+P5+P7)| \quad (13)$$

The calculation formula for the secondary spring abnormality index is previously stored in the calculation unit 12.

The wheel loads P1 to P8 of the eight wheels 3 provided in the vehicle 2 are measured by the wheel load sensors 11 provided on the track (a measurement step).

The wheel load data P1 to P8 measured by the wheel load sensors 11 are transmitted to the calculation unit 12 from the wheel load sensors 11. The calculation unit 12 calculates a value of the secondary spring abnormality index by the previously installed program based on Expression (13) described above. An operator determines that the secondary spring abnormality occurs when the calculated value of the secondary spring abnormality index is larger than a predefined reference value (a detection step). Alternatively, a configuration in which the reference value is previously stored in the calculation unit 12, and the calculation unit 12 automatically determines that the secondary spring abnormality occurs when the calculated value of the secondary spring abnormality index is larger than the stored reference value may be also employed. The reference value for determination may be defined according to a curvature of the track at a position where the wheel load sensor 11 is provided or the weight of the vehicle.

As described above, whether the secondary spring abnormality occurs can be determined based on the secondary spring abnormality index value calculated from the wheel loads measured by the wheel load sensors 11 provided on the rails. Accordingly, the secondary spring abnormality can be easily and inexpensively detected as compared to a case in which a sensor is attached to the vehicle.

Lastly, a method for detecting an abnormality in a case in which the type of the vehicle abnormality is a static wheel load imbalance abnormality is described.

The static wheel load imbalance abnormality is an abnormality in which a weight of the vehicle 2 applied to the eight wheels provided in the vehicle 2 is out of balance. Examples of the type of the static wheel load imbalance abnormality include lateral eccentricity of the vehicle 2, twist of the bogie 4, and twist of the vehicle 2.

The lateral eccentricity of the vehicle 2 means that a total of the wheel loads of the wheels 3 located on a right side of the vehicle 2 and a total of the wheel loads of the wheels 3 located on a left side of the vehicle 2 are out of balance. Thus, an index of the static wheel load imbalance abnormality (a first static wheel load imbalance abnormality index) corresponding to the lateral eccentricity of the vehicle 2 can be expressed by Expression (14).

First static wheel load imbalance abnormality
index=$|(P1+P3+P5+P7)-(P2+P4+P6+P8)|$ (14)

The twist of the bogie 4 means that a total of the wheel loads of the wheels 3 located in one of two diagonal directions of one bogie 4, and a total of the wheel loads of the wheels 3 located in the other of the diagonal directions are out of balance. Thus, an index of the static wheel load imbalance abnormality (second and third static wheel load imbalance abnormality indexes) corresponding to the twist of the bogie 4 can be expressed by Expressions (15) and (16).

Second static wheel load imbalance abnormality
index=$|(P1+P4)-(P2+P3)|$ (15)

Third static wheel load imbalance abnormality
index=$|(P5+P8)-(P6+P7)|$ (16)

The twist of the vehicle 2 means that a total of the wheel loads of the wheels 3 located in one of two diagonal directions of the vehicle 2, and a total of the wheel loads of the wheels 3 located in the other of the diagonal directions are out of balance. Thus, an index of the static wheel load imbalance abnormality (a fourth static wheel load imbalance abnormality index) corresponding to the twist of the vehicle 2 can be expressed by Expression (17).

Fourth static wheel load imbalance abnormality
index=$|(P1+P3)+(P6+P8)-(P2+P4)-(P5+P7)|$ (17)

The calculation formulas for the first to fourth static wheel load imbalance abnormality indexes are previously stored in the calculation unit 12.

The wheel loads P1 to P8 of the eight wheels 3 provided in the vehicle 2 are measured by the wheel load sensors 11 provided on the track (a measurement step).

The wheel load data P1 to P8 measured by the wheel load sensors 11 are transmitted to the calculation unit 12 from the wheel load sensors 11. The calculation unit 12 calculates values of the first to fourth static wheel load imbalance abnormality indexes by the previously installed program based on Expressions (14) to (17) described above. An operator determines that the static wheel load imbalance abnormality occurs when any of the calculated values of the first to fourth static wheel load imbalance abnormality indexes is larger than a predefined corresponding reference value (a detection step). Alternatively, a configuration in which the respective reference values are previously stored in the calculation unit 12, and the calculation unit 12 automatically determines that the static wheel load imbalance abnormality occurs when any of the calculated values of the first to fourth static wheel load imbalance abnormality indexes is larger than the stored corresponding reference value may be also employed. The reference value for determination may be defined according to a curvature of the track at a position where the wheel load sensor 11 is provided or the weight of the vehicle.

As described above, whether the static wheel load imbalance abnormality occurs can be determined based on the first to fourth static wheel load imbalance abnormality index values calculated from the wheel loads measured by the wheel load sensors 11 provided on the rails. Accordingly, the static wheel load imbalance abnormality can be easily and inexpensively detected as compared to a case in which a sensor is attached to the vehicle.

In the respective detection steps described above, the calculation unit 12 calculates the value of the index according to the type of the vehicle abnormality. However, a person may calculate the index value based on the measured wheel loads without using the calculation unit 12.

In the present embodiment, the pair of wheel load sensors 11 are attached to the right and left rails R to measure the wheel loads. Even when attachment positions of the respective wheel load sensors 11 are longitudinally displaced from each other with respect to a running direction of the vehicle 2, the respective index values can be calculated from the wheel loads measured by the respective wheel load sensors 11. However, when the positions of the respective wheel load sensors 11 are longitudinally displaced from each other, a lateral balance of the wheel loads cannot be accurately measured since the wheel loads measured by the respective wheel load sensors 11 are not measured at the same time. The accuracy of the calculated values of the respective indexes may be thereby deteriorated.

Thus, the wheel load sensors 11 are preferably attached to the rails R so as to be able to measure the wheel loads of the pair of right and left wheels provided in the bogie 4 at the same time. To be more specific, for example, the pair of wheel load sensors 11 may be attached on a straight line perpendicular to the right and left rails R. Accordingly, the lateral balance of the wheel loads can be accurately measured, and the accuracy of the calculated values of the respective indexes can be improved.

Alternatively, the wheel load sensors 11 may be attached to the rails R so as to be able to measure the wheel loads of the four wheels 3 provided in any of the front and back bogies 4 at the same time. To be more specific, four wheel load sensors 11 may be attached to positions of the right and left rails R corresponding to arrangement positions of the four wheels 3 provided in the bogie 4. Accordingly, the wheel loads of the four wheels 3 provided in one bogie 4 can be measured at the same time. The value of the index represented by the wheel loads of the four wheels 3 provided in the bogie 4, e.g., the primary spring abnormality index value can be accurately calculated.

Alternatively, the wheel load sensors 11 may be attached to the rails R so as to be able to measure the wheel loads of the eight wheels 3 provided in the vehicle 2 at the same time. To be more specific, eight wheel load sensors 11 may be attached to positions of the right and left rails R corresponding to arrangement positions of the eight wheels 3 provided in the vehicle 2. Accordingly, the wheel loads of the eight wheels 3 provided in the vehicle 2 can be measured at the same time. The value of the index represented by the wheel loads of the eight wheels 3 provided in the vehicle 2, e.g., the secondary spring abnormality index value or the static wheel load imbalance abnormality index value can be accurately calculated.

Although the sensor including the strain gauges 13 has been described as an example of the wheel load sensor 11 in the present embodiment, a load cell may be used as the wheel load sensor 11. When the load cell is used as the wheel load sensor 11, the load cell can be provided under the rail R so as to measure the wheel load.

Although the vehicle 2 is configured to include the pair of front and back bogies each having the wheels on the front right, front left, back right, and back left sides (the wheels on two axles on front and back sides) in the present embodiment, the vehicle 2 may have another configuration. For example, the vehicle may be configured to include a pair of front and back bogies each having a pair of right and left wheels (wheels on a single axle), configured to include a pair of front and back bogies each having wheels on three axles, or configured to longitudinally include three bogies each having wheels on two axles on front and back sides. In any configuration of the vehicle, an index represented by wheel loads of a pair or more of right and left wheels provided in at least each of the bogies may be defined according to the type of the vehicle abnormality.

Example 1

A change in the value of the primary spring abnormality index was examined both in a case in which the coil spring was normal and in a case in which the coil spring was broken, by setting conditions of a running speed and a boarding state of the vehicle as described below. The track along which the vehicle ran was set to a circular curve section having a radius of 120 m. As for the breakage of the coil spring, the coil springs of the respective wheels on an outer rail and an inner rail on the front side of the front bogie were broken. The wheel loads of the wheels of the front bogie were measured.

Two conditions of 10 km/h and 40 km/h were set as the running speed.

Three conditions of empty, seating capacity, and 250% full (passengers exceeding the seating capacity by 250%) were set as the boarding state.

To facilitate comparison of the influences of the respective conditions, a change in a standardized primary spring abnormality index value obtained by standardizing the primary spring abnormality index using a following expression, not the primary spring abnormality index value itself expressed by Expression (11) described above, in the case in which the coil spring was normal and in the case in which the coil spring was broken was examined.

Standardized primary spring abnormality index=|(primary spring abnormality index-bogie twist component under a normal state)|/(half of a reference vehicle weight)

Here, the bogie twist component under a normal state means a value in a following expression when the primary spring is normal, the vehicle is empty, and the running speed is 40 km/h.

Bogie twist component under a normal state=|($P1+P4$)−($P2+P3$)|

Also, the reference vehicle weight is a load of an empty vehicle per bogie.

Figure 5:
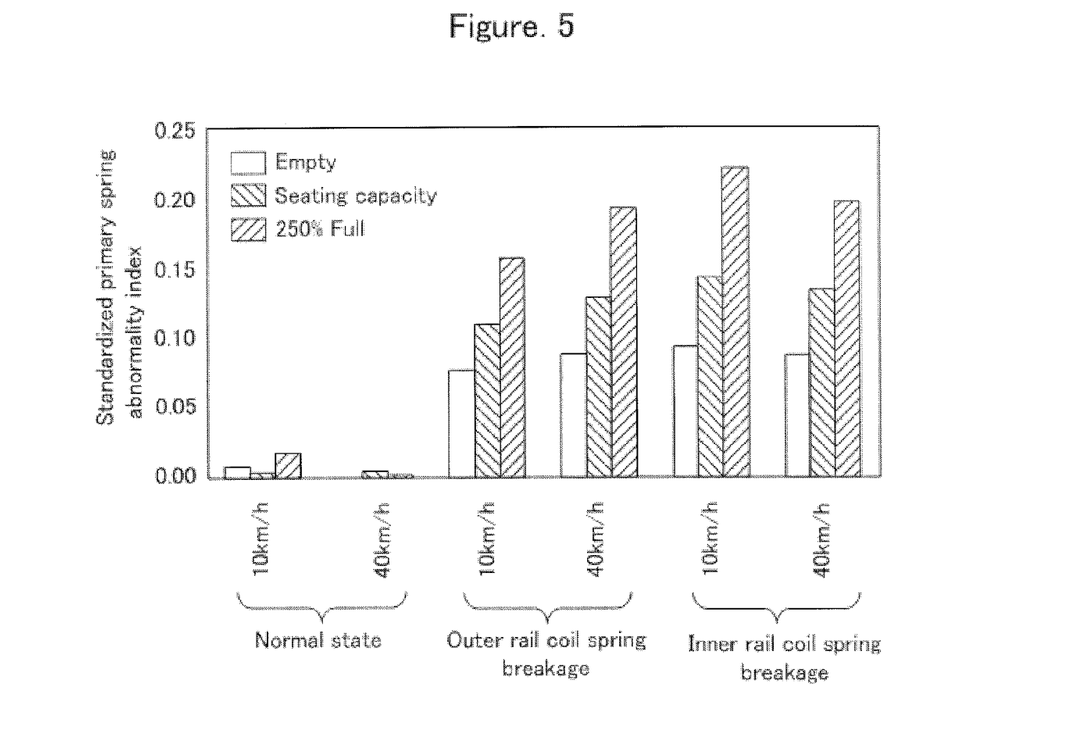
FIG. 5 is a graph illustrating standardized primary spring abnormality index values in a case in which a primary spring is normal and in a case in which the primary spring is broken.

FIG. 5 is a graph illustrating the standardized primary spring abnormality index value in the case in which the primary spring is normal and in the case in which the primary spring is broken.

As shown in FIG. 5, when the coil spring of any of the wheel on the outer rail and the wheel on the inner rail is broken, the standardized primary spring abnormality index value becomes significantly larger than that under the normal state regardless of the running speed or the boarding state of the vehicle.

Accordingly, it is confirmed that the primary spring abnormality can be detected by the standardized primary spring abnormality index. Since the standardized primary spring abnormality index and the primary spring abnormality index are in positive correlation, of course, the primary spring abnormality can be detected by the primary spring abnormality index.

As described above, detecting the primary spring abnormality by using the standardized primary spring abnormality index is substantially the same as detecting the primary spring abnormality by using the primary spring abnormality index.

Example 2

A change in the value of the secondary spring abnormality index in a case in which the air spring was normal and in a case in which the air spring malfunctioned was examined by setting conditions of a running speed and a boarding state of the vehicle as described below. The track along which the vehicle ran was set to a circular curve section having a radius of 120 m. As for the malfunction of the air spring, an exhaust system or an intake system of the air spring on the left side or the right side of the front bogie was intentionally caused to malfunction.

Two conditions of 10 km/h and 40 km/h were set as the running speed.

Three conditions of empty, seating capacity, and 250% full (passengers exceeding the seating capacity by 250%) were set as the boarding state.

To facilitate comparison of the influences of the respective conditions, a change in a standardized secondary spring abnormality index value obtained by standardizing the secondary spring abnormality index using a following expression, not the secondary spring abnormality index value itself expressed by Expression (13) described above, in the case in which the air spring was normal and in the case in which the air spring was broken was examined.

Standardized secondary spring abnormality index=|(secondary spring abnormality index-vehicle twist component under a normal state)|/(reference vehicle weight)

Here, the vehicle twist component under a normal state means a value in a following expression when the secondary spring is normal, the vehicle is empty, and the running speed is 40 km/h.

Vehicle twist component under a normal state=|(P1+P3+P6+P8)−(P2+P4+P5+P7)|

Also, the reference vehicle weight is a load of an empty vehicle per bogie.

Figure 6:
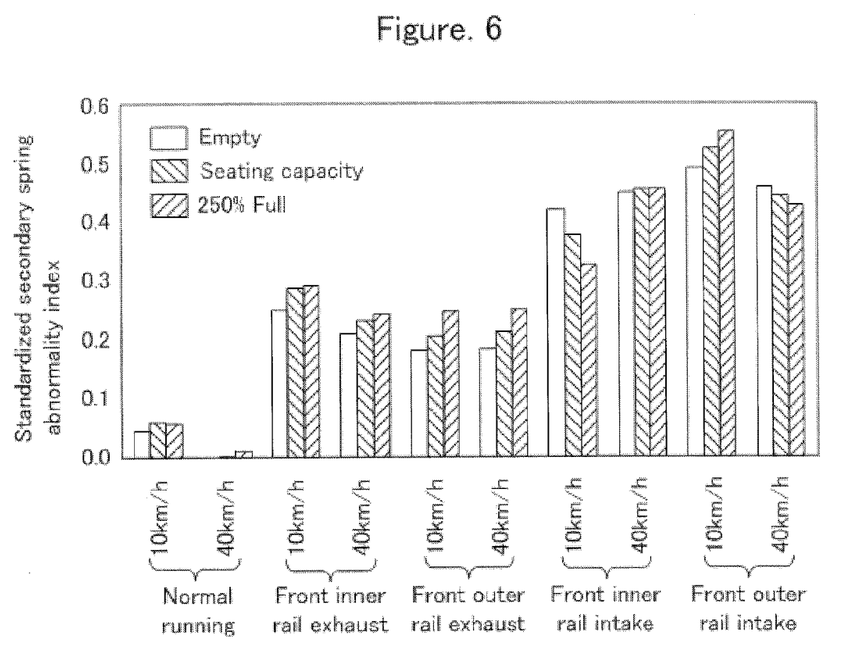
FIG. 6 is a graph illustrating standardized secondary spring abnormality index values in a case in which a secondary spring is normal and in a case in which the secondary spring malfunctions.

FIG. 6 is a graph illustrating the standardized secondary spring abnormality index value in the case in which the secondary spring is normal and in the case in which the secondary spring malfunctions. In FIG. 6, "front inner rail exhaust" means a case in which the exhaust system of the air spring on the inner rail of the front bogie is caused to malfunction, "front outer rail exhaust" a case in which the exhaust system of the air spring on the outer rail of the front bogie is caused to malfunction, "front inner rail intake" a case in which the intake system of the air spring on the inner rail of the front bogie is caused to malfunction, and "front outer rail intake" a case in which the intake system of the air spring on the outer rail of the front bogie is caused to malfunction.

As shown in FIG. 6, when the exhaust system or the intake system of the air spring on either the outer rail or the inner rail malfunctions, the standardized secondary spring abnormality index value becomes significantly larger than that under the normal state regardless of the running speed or the boarding state of the vehicle.

Accordingly, it is confirmed that the secondary spring abnormality can be detected by the standardized secondary spring abnormality index. Since the standardized secondary spring abnormality index and the secondary spring abnormality index are in positive correlation, of course, the secondary spring abnormality can be detected by the secondary spring abnormality index.

As described above, detecting the secondary spring abnormality by using the standardized secondary spring abnormality index is substantially the same as detecting the secondary spring abnormality by using the secondary spring abnormality index.

REFERENCE SIGNS LIST

2 Vehicle
3 Wheel
4 Bogie
11 Wheel load sensor
13 Strain gauge

The invention claimed is:

1. A method for detecting an abnormality of a vehicle including bogies comprising a pair of front and back bogies each having two pairs of right and left wheels on front and back sides while the vehicle is running on a track, the method comprising:
an installation step of previously providing a wheel load sensor for measuring a wheel load of a wheel on the track;
an index definition step of previously defining an index represented by wheel loads of four wheels provided in at least one of the bogies as the index for detecting a vehicle abnormality according to a type of the vehicle abnormality;
a measurement step of measuring the wheel loads of the four wheels provided in at least one of the bogies by the wheel load sensor provided on the track; and
a detection step of calculating a value of the index defined in the index definition step from the wheel loads measured in the measurement step, and detecting the vehicle abnormality of the vehicle based on the calculated value of the index,
wherein in the index definition step, a primary spring abnormality index as the index when the type of the vehicle abnormality is a primary spring abnormality is defined as in Expression (1) below, and
in the detection step, a value of the primary spring abnormality index is calculated from the wheel loads measured in the measurement step, and it is determined that the primary spring abnormality occurs in the vehicle when the calculated value of the primary spring abnormality index is larger than a predefined reference value, primary spring abnormality index=|(P1+P4)−(P2+P3)|   (1)

where P1 to P4 are the wheel loads of the four wheels provided in the at least one of the bogies: P1 represents a wheel load of a wheel located on a front right side of the at least one of the bogies; P2 a wheel load of a wheel located on a front left side of the at least one of the bogies; P3 a wheel load of a wheel located on a back right side of the at least one of the bogies; and P4 a wheel load of a wheel located on a back left side of the at least one of the bogies in Expression (1).

2. A method for detecting an abnormality of a vehicle including bogies comprising a pair of front and back bogies each having two pairs of right and left wheels on front and back sides while the vehicle is running on a track, the method comprising:
an installation step of previously providing a wheel load sensor for measuring a wheel load of a wheel on the track;
an index definition step of previously defining an index represented by wheel loads of four wheels provided in at least one of the bogies as the index for detecting a vehicle abnormality according to a type of the vehicle abnormality;
a measurement step of measuring the wheel loads of the four wheels provided in at least one of the bogies by the wheel load sensor provided on the track; and
a detection step of calculating a value of the index defined in the index definition step from the wheel loads measured in the measurement step, and detecting the vehicle abnormality of the vehicle based on the calculated value of the index,
wherein in the index definition step, a secondary spring abnormality index as the index when the type of the vehicle abnormality is a secondary spring abnormality is defined as in Expression (2) below, and
in the detection step, a value of the secondary spring abnormality index is calculated from the wheel loads measured in the measurement step, and it is determined that the secondary spring abnormality occurs in the vehicle when the calculated value of the secondary spring abnormality index is larger than a predefined reference value, secondary spring abnormality index=|(P1+P3+P6+P8)−(P2+P4+P5+P7)|   (2)

where P1 represents a wheel load of a wheel located on a front right side of the front bogie; P2 a wheel load of a wheel located on a front left side of the front bogie; P3 a wheel load of a wheel located on a back right side of the front bogie; P4 a wheel load of a wheel located on a back left side of the front bogie; P5 a wheel load of a wheel located on a front right side of the back bogie; P6 a wheel load of a wheel located on a front left side of the back bogie; P7 a wheel load of a wheel located on a back right side of the back bogie; and P8 a wheel load of a wheel located on a back left side of the back bogie in Expression (2).

3. A method for detecting an abnormality of a vehicle including bogies comprising a pair of front and back bogies each having two pairs of right and left wheels on front and back sides while the vehicle is running on a track, the method comprising:

an installation step of previously providing a wheel load sensor for measuring a wheel load of a wheel on the track;

an index definition step of previously defining an index represented by wheel loads of four wheels provided in at least one of the bogies as the index for detecting a vehicle abnormality according to a type of the vehicle abnormality;

a measurement step of measuring the wheel loads of the four wheels provided in at least one of the bogies by the wheel load sensor provided on the track; and a detection step of calculating a value of the index defined in the index definition step from the wheel loads measured in the measurement step, and detecting the vehicle abnormality of the vehicle based on the calculated value of the index, wherein in the index definition step, a first static wheel load imbalance abnormality index, a second static wheel load imbalance abnormality index, a third static wheel load imbalance abnormality index, and a fourth static wheel load imbalance abnormality index as the index when the type of the vehicle abnormality is a static wheel load imbalance abnormality are respectively defined as in Expressions (3), (4), (5), and (6) below, and in the detection step, values of the first to fourth static wheel load imbalance abnormality indexes are calculated from the wheel loads measured in the measurement step, and it is determined that the static wheel load imbalance abnormality occurs in the vehicle when any of the calculated values of the first to fourth static wheel load imbalance abnormality indexes is larger than a predefined corresponding reference value, $$\text{first static wheel load imbalance abnormality index} = |(P1+P3+P5+P7)-(P2+P4+P6+P8)| \quad (3)$$

$$\text{second static wheel load imbalance abnormality index} = |(P1+P4)-(P2+P3)| \quad (4)$$

$$\text{third static wheel load imbalance abnormality index} = |(P5+P8)-(P6+P7)| \quad (5)$$

$$\text{fourth static wheel load imbalance abnormality index} = |(P1+P3)+(P6+P8)-(P2+P4)-(P5+P7)| \quad (6)$$

where P1 represents a wheel load of a wheel located on a front right side of the front bogie; P2 a wheel load of a wheel located on a front left side of the front bogie; P3 a wheel load of a wheel located on a back right side of the front bogie; P4 a wheel load of a wheel located on a back left side of the front bogie; P5 a wheel load of a wheel located on a front right side of the back bogie; P6 a wheel load of a wheel located on a front left side of the back bogie; P7 a wheel load of a wheel located on a back right side of the back bogie; and P8 a wheel load of a wheel located on a back left side of the back bogie in Expressions (3) to (6).

4. The method for detecting an abnormality of a vehicle according to claim 1,
wherein in the installation step, the wheel load sensor is provided on the track so as to be able to measure the wheel loads of any of the pairs of right and left wheels on the front and back sides provided in the at least on of the bogies at the same time.

5. The method for detecting an abnormality of a vehicle according to claim 1,
wherein in the installation step, the wheel load sensor is provided on the track so as to be able to measure the wheel loads of the four wheels provided in the at least one of the bogies at the same time.

6. The method for detecting an abnormality of a vehicle according to claim 1,
wherein in the installation step, the wheel load sensor is provided on the track so as to be able to measure wheel loads of eight wheels provided in the vehicle at the same time.

7. The method for detecting an abnormality of a vehicle according to claim 1,
wherein a sensor including a strain gauge is used as the wheel load sensor.

8. The method for detecting an abnormality of a vehicle according to claim 1,
wherein a load cell is used as the wheel load sensor.

9. An apparatus for detecting an abnormality of a vehicle including a pair of front and back bogies each having two pairs of right and left wheels on front and back sides while the vehicle is running on a track, the apparatus comprising:

a wheel load sensor that is provided on the track to measure a wheel load of a wheel of the vehicle; and a calculation unit that is connected to the wheel load sensor and configured to perform the following steps:

an index definition step of previously defining an index represented by wheel loads of four wheels provided in at least one of the bogies as the index for detecting a vehicle abnormality according to a type of the vehicle abnormality;
and a detection step of calculating a value of the index defined in the index definition step from the wheel loads measured by the wheel load sensor, and detecting the vehicle abnormality of the vehicle based on the calculated value of the index, wherein in the index definition step, a primary spring abnormality index as the index when the type of the vehicle abnormality is a primary spring abnormality is defined as in Expression (1) below, and in the detection step, a value of the primary spring abnormality index is calculated from the wheel loads measured by the wheel load sensor, and it is determined that the primary spring abnormality occurs in the vehicle when the calculated value of the primary spring abnormality index is larger than a predefined reference value, $$\text{primary spring abnormality index} = |(P1+P4)-(P2+P3)| \quad (1)$$

where P1 to P4 are the wheel loads of the four wheels provided in the at least one of the bogies: P1 represents a wheel load of a wheel located on a front right side of the at least one of the bogies; P2 a wheel load of a wheel located on a front left side of the at least one of the bogies; P3 a wheel load of a wheel located on a back right side of the at least one of the bogies; and P4 a wheel load of a wheel located on a back left side of the at least one of the bogies in Expression (1), wherein the index represented by wheel loads of four wheels provided in at least one of the bogies and defined according to a type of vehicle abnormality as the index for detecting the vehicle abnormality is previously stored in the calculation unit, and the calculation unit calculates a value of a stored index from the wheel loads of the four wheels provided in at least one of the bogies measured by the wheel load sensor and transmitted from the wheel load sensor, and detects the vehicle abnormality of the vehicle based on the calculated value of the index.

10. The method for detecting an abnormality of a vehicle according to claim 2,
wherein in the installation step, the wheel load sensor is provided on the track so as to be able to measure the wheel loads of any of the pairs of right and left wheels on the front and back sides provided in the at least one of bogies at the same time.

11. The method for detecting an abnormality of a vehicle according to claim 2,
wherein in the installation step, the wheel load sensor is provided on the track so as to be able to measure the wheel loads of the four wheels provided in the at least one of the bogies at the same time.

12. The method for detecting an abnormality of a vehicle according to claim 2,
wherein in the installation step, the wheel load sensor is provided on the track so as to be able to measure wheel loads of eight wheels provided in the vehicle at the same time.

13. The method for detecting an abnormality of a vehicle according to claim 2,
wherein a sensor including a strain gauge is used as the wheel load sensor.

14. The method for detecting an abnormality of a vehicle according to claim 2,
wherein a load cell is used as the wheel load sensor.

15. The method for detecting an abnormality of a vehicle according to claim 3,
wherein in the installation step, the wheel load sensor is provided on the track so as to be able to measure the wheel loads of any of the pairs of right and left wheels on the front and back sides provided in the at least one of the bogies at the same time.

16. The method for detecting an abnormality of a vehicle according to claim 3,
wherein in the installation step, the wheel load sensor is provided on the track so as to be able to measure the wheel loads of the four wheels provided in the at least one of the bogies at the same time.

17. The method for detecting an abnormality of a vehicle according to claim 3,
wherein in the installation step, the wheel load sensor is provided on the track so as to be able to measure wheel loads of eight wheels provided in the vehicle at the same time.

18. The method for detecting an abnormality of a vehicle according to claim 3,
wherein a sensor including a strain gauge is used as the wheel load sensor.

19. The method for detecting an abnormality of a vehicle according to claim 3,
wherein a load cell is used as the wheel load sensor.

20. An apparatus for detecting an abnormality of a vehicle including a pair of front and back bogies each having two pairs of right and left wheels on front and back sides while the vehicle is running on a track, the apparatus comprising:
a wheel load sensor that is provided on the track to measure a wheel load of a wheel of the vehicle; and
a calculation unit that is connected to the wheel load sensor and configured to perform the following steps:
an index definition step of previously defining an index represented by wheel loads of four wheels provided in at least one of the bogies as the index for detecting a vehicle abnormality according to a type of the vehicle abnormality;
and
a detection step of calculating a value of the index defined in the index definition step from the wheel loads measured by the wheel load sensor, and detecting the vehicle abnormality of the vehicle based on the calculated value of the index,
wherein in the index definition step, a secondary spring abnormality index as the index when the type of the vehicle abnormality is a secondary spring abnormality is defined as in Expression (2) below, and
in the detection step, a value of the secondary spring abnormality index is calculated from the wheel loads measured by the wheel load sensor, and it is determined that the secondary spring abnormality occurs in the vehicle when the calculated value of the secondary spring abnormality index is larger than a predefined reference value, $$\text{secondary spring abnormality index}=|(P1+P3+P6+P8)-(P2+P4+P5+P7)| \qquad (2)$$

where P1 represents a wheel load of a wheel located on a front right side of the front bogie; P2 a wheel load of a wheel located on a front left side of the front bogie; P3 a wheel load of a wheel located on a back right side of the front bogie; P4 a wheel load of a wheel located on a back left side of the front bogie; P5 a wheel load of a wheel located on a front right side of the back bogie; P6 a wheel load of a wheel located on a front left side of the back bogie; P7 a wheel load of a wheel located on a back right side of the back bogie; and P8 a wheel load of a wheel located on a back left side of the back bogie in Expression (2), wherein the index represented by wheel loads of four wheels provided in at least one of the bogies and defined according to a type of vehicle abnormality as the index for detecting the vehicle abnormality is previously stored in the calculation unit, and the calculation unit calculates a value of a stored index from the wheel loads of the four wheels provided in at least one of the bogies measured by the wheel load sensor and transmitted from the wheel load sensor, and detects the vehicle abnormality of the vehicle based on the calculated value of the index.

21. An apparatus for detecting an abnormality of a vehicle including a pair of front and back bogies each having two pairs of right and left wheels on front and back sides while the vehicle is running on a track, the apparatus comprising:
a wheel load sensor that is provided on the track to measure a wheel load of a wheel of the vehicle; and
a calculation unit that is connected to the wheel load sensor and configured to perform the following steps:
an index definition step of previously defining an index represented by wheel loads of four wheels provided in at least one of the bogies as the index for detecting a vehicle abnormality according to a type of the vehicle abnormality; and a detection step of calculating a value of the index defined in the index definition step from the wheel loads measured by the wheel load sensor, and detecting the vehicle abnormality of the vehicle based on the calculated value of the index, wherein in the index definition step, a first static wheel load imbalance abnormality index, a second static wheel load imbalance abnormality index, a third static wheel load imbalance abnormality index, and a fourth static wheel load imbalance abnormality index as the index when the type of the vehicle abnormality is a static wheel load imbalance abnormality are respectively defined as in Expressions (3), (4), (5), and (6) below, and in the detection step, values of the first to fourth static wheel load imbalance abnormality indexes are calculated from the wheel loads measured by the wheel load sensor, and it is determined that the static wheel load imbalance abnormality occurs in the vehicle when any of the calculated values of the first to fourth static wheel load imbalance abnormality indexes is larger than a predefined corresponding reference value, $$\text{first static wheel load imbalance abnormality index} = |(P1+P3+P5+P7)-(P2+P4+P6+P8)| \quad (3)$$

$$\text{second static wheel load imbalance abnormality index} = |(P1+P4)-(P2+P3)| \quad (4)$$

$$\text{third static wheel load imbalance abnormality index} = |(P5+P8)-(P6+P7)| \quad (5)$$

$$\text{fourth static wheel load imbalance abnormality index} = |(P1+P3)+(P6+P8)-(P2+P4)-(P5+P7)| \quad (6)$$

where P1 represents a wheel load of a wheel located on a front right side of the front bogie; P2 a wheel load of a wheel located on a front left side of the front bogie; P3 a wheel load of a wheel located on a back right side of the front bogie; P4 a wheel load of a wheel located on a back left side of the front bogie; P5 a wheel load of a wheel located on a front right side of the back bogie; P6 a wheel load of a wheel located on a front left side of the back bogie; P7 a wheel load of a wheel located on a back right side of the back bogie; and P8 a wheel load of a wheel located on a back left side of the back bogie in Expressions (3) to (6), wherein the index represented by wheel loads of four wheels provided in at least one of the bogies and defined according to a type of vehicle abnormality as the index for detecting the vehicle abnormality is previously stored in the calculation unit, and the calculation unit calculates a value of a stored index from the wheel loads of the four wheels provided in at least one of the bogies measured by the wheel load sensor and transmitted from the wheel load sensor, and detects the vehicle abnormality of the vehicle based on the calculated value of the index.

* * * * *